(12) United States Patent
Blasco (10) Patent No.: US 7,540,381 B2
(45) Date of Patent: Jun. 2, 2009

(54) REUSABLE SHIPPING CONTAINER FOR FRAGILE OBJECTS

(76) Inventor: Stanley J. Blasco, P.O. Box 256, Fairplay, SC (US) 29643

( * ) Notice: Subject to any disclaimer, the term of this patent is extended or adjusted under 35 U.S.C. 154(b) by 424 days.

(21) Appl. No.: 11/233,325

(22) Filed: Sep. 21, 2005

(65) Prior Publication Data

US 2006/0071437 A1    Apr. 6, 2006

Related U.S. Application Data

(60) Provisional application No. 60/612,466, filed on Sep. 23, 2004.

(51) Int. Cl.
*B65D 85/48* (2006.01)
(52) U.S. Cl. .................. 206/454; 206/449; 220/817; 220/819; 220/826
(58) Field of Classification Search .............. 206/454, 206/449, 372, 373, 448, 561, 586; 220/817, 220/819, 810, 818, 826; 190/4, 114; 280/79.2
See application file for complete search history.

(56) References Cited

U.S. PATENT DOCUMENTS

| | | | | |
|---|---|---|---|---|
| 132,998 A * | 11/1872 | Yaw | ........................ | 312/290 |
| 1,121,232 A | 12/1914 | Davis | ........................ | 206/587 |
| 2,268,199 A * | 12/1941 | Greer | ........................ | 446/82 |
| 3,454,068 A * | 7/1969 | Copen et al. | ........................ | 190/109 |
| 3,661,435 A * | 5/1972 | Miller | ........................ | 312/321 |
| 4,793,508 A * | 12/1988 | Thompson | ........................ | 220/533 |
| 4,936,454 A * | 6/1990 | Wang | ........................ | 206/425 |
| 5,086,888 A * | 2/1992 | Chu | ........................ | 190/107 |
| 5,269,422 A * | 12/1993 | Chevrette | ........................ | 206/448 |
| 5,269,599 A * | 12/1993 | Moring | ........................ | 312/290 |
| 5,560,507 A * | 10/1996 | Arpin et al. | ........................ | 220/1.5 |
| 5,678,693 A * | 10/1997 | Tapp et al. | ........................ | 206/454 |
| 6,099,220 A | 8/2000 | Poth | ........................ | 410/94 |
| 6,299,184 B1 | 10/2001 | Krawczyk | ........................ | 280/79.2 |
| 6,520,515 B2 | 2/2003 | Krawczyk | ........................ | 280/79.2 |
| 6,533,122 B1 | 3/2003 | Plunkett | ........................ | 206/600 |
| 6,755,304 B2 | 6/2004 | Ryals | ........................ | 206/443 |
| 2004/0163988 A1 * | 8/2004 | Yamada et al. | ........................ | 206/454 |

OTHER PUBLICATIONS

ULINE Shipping Supply Specialist Product Catalog, Fall/Winter 2008-2009, heavy duty bulk cargo container products, pp. 23-25; downloaded from website at http://www.uline.com.

* cited by examiner

*Primary Examiner*—David T Fidei
(74) *Attorney, Agent, or Firm*—Monte R. Rhodes (57) ABSTRACT

A reusable shipping container having hingeable lids is described for use in transporting fragile items and artwork, such as paintings, mirrors, and the like. The container is made up of two substantially parallel end panels, a bottom panel extending between and perpendicular to the two end panels, a back panel extending perpendicular to the bottom panel and the two end panels, a lower front panel extending substantially perpendicular to the bottom panel and to the end panels, an upper front panel co-planar with the lower front panel and attached to the upper edge of the lower front panel with a hingeable means allowing for hingeable rotation, and a top panel that is substantially parallel to the bottom panel and is attached to the upper edge of the back panel with an attachment means that allows the top panel to rotate out of parallel with the bottom panel.

19 Claims, 11 Drawing Sheets

REUSABLE SHIPPING CONTAINER FOR FRAGILE OBJECTS

CROSS REFERENCE TO RELATED APPLICATIONS

The present application claims priority to U.S. Provisional Patent Application Ser. No. 60/612,466 filed Sep. 23, 2004, the contents of all of which are incorporated herein by reference.

FIELD OF THE INVENTION

The present invention relates to shipping containers and, more specifically, to reusable shipping containers for fragile items and artwork.

DESCRIPTION OF RELATED ART

In both the residential and commercial shipping business, many types of boxes and containers are used to protect and organize items during their transport. An important part of the moving business is to provide ways of packing and shipping customers personal objects in a manner that ensures that they are not easily damaged, broken, or marred, and that allows them to be loaded and unloaded quickly and easily. The moving company must also be attentive to keeping the costs of shipping and packing materials used in preparing the goods for moving low, and making it as easy as possible to pack and load the goods into containers, while simultaneously minimizing the use of disposable and sometimes costly wrapping materials and containers, such as cardboard boxes.

Typically, fragile items such as mirrors, or valuable items such as framed artwork, which are to be transported between two often remote locations are wrapped in paper such as newsprint, or some other type of protective covering. The wrapped items are then typically inserted into boxes, depending upon their size. Typical boxes used in the moving industry are made of corrugated cardboard and are designed to be used only once, creating great waste and having a substantial cost. Specially sized boxes (including corrugated cardboard boxes), referred to in the field as "Specialty Boxes", are made to transport such bulky and fragile items such as mirrors, pictures and the like. However, even with due care, such items can be damaged during transport using conventional packing and transport means.

A variety of different solutions have been proposed in order to solve or minimize the problem of damaged goods, especially fragile items like mirrors and artwork, during transport. These solutions often also attempt to address the issue of cost associated with using non-reusable packing and shipping containers, such as corrugated cardboard boxes. For example, U.S. Pat. No. 6,533,122 to Plunkett suggests a foldable shipping container for use in transporting liquids, powders, or solids. The container is described as having a generally rectangular base pivotally connected to a first side wall and a second side wall, a first lid section pivotally connected to the first side wall, a second lid section pivotally connected to the second side wall, and a third lid section pivotally connected to the first section.

In U.S. Pat. No. 1,121,232 to Charles Davis, a package for fragile tubes is suggested, specifically directed to receiving, transporting, and/or storing fragile tubes of glass or other similar material containing medical, surgical, or other supplies. Such a package is described to provide a cheap and efficient package to protect tubes against breakage during transport. The package is described to consist of a single piece of corrugated cardboard that is bent and arranged into a suitable container.

U.S. Pat. No. 6,755,304 to Ryals offers a shipping container for elongated articles, such as gas springs, that is economical to manufacture, easy to load and unload, provides protection for the articles, is reusable, and allows the goods to be shipped without any disposable wrapping or packing materials, due to the use of a cushioning member formed of a closed-cell polymeric foam, such as neoprene. The receptacle members for holding the elongated articles each define a hollow channel having a lower end and an upper end, where the lower end is in proximity to the cushioning member, while the upper end is in proximity to the rigid container housing.

However, while these approaches have likely been successful to some degree, they do not address the need to provide moving containers for fragile items such as mirrors and artwork that are reusable and cheap to manufacture. Thus, there exists a need for a reusable, economical moving container for moving a variety of fragile, typically elongate or rectangular household items which can overcome the aforementioned disadvantages associated with the conventional shipping containers.

SUMMARY OF THE INVENTION

The present invention is directed to a reusable shipping container for moving fragile, delicate, or unique items, such as mirrors, stain glass windows, and the like. The containers as described herein optionally can contain spacing blocks or spacing jigs in a variety of orientations, such as along the bottom of the container, along the sides of the container, or both. As the containers of the present disclosure have two door lids, their inclusion and use allow for a larger opening to both place objects into the container, and ease in removing objects from the container, both features that are important when handling fragile, delicate, or unique items. The opening provided when both door lids are open also allows for the user to add further packing material so as to further protect the objects within the container during transport.

In one aspect of the present invention, a container useful for shipping, storing and moving fragile items and the like is described, wherein the container comprises a bottom, two substantially parallel sides, a back, a front panel that is shorter than the back, and two closable, hingeably attached lids. A first lid is hingeably attached along the upper edge of the back, while the second lid is hingeably attached along the upper edge of the shorter, front panel. When these two panels are in their closed positions, they meet in manner such that they form the top and remaining front portion of the container, thereby resulting in a substantially enclosed container.

In a further aspect of the present invention, a container comprising a bottom, two substantially parallel sides, a back panel, a front panel that is shorter than the front, and a bi-fold top, or lid, is described. The bi-fold top consists of two pieces, a first piece and a second piece, which are hingeably, and rotatably, connected to each other along one face. The second piece is further hingeably, and rotatably, connected along the upper edge of the back of the container. During closure of the container, the first piece forms the remaining section of the shorter, front panel, while the second piece forms the top panel of the container, such that the top panel is substantially parallel to the bottom of the container, and the first piece is substantially parallel to the back panel. This bi-fold assembly also allows for easier and greater access to the interior compartment of the container, for ease in installing or removing objects from the container.

An additional aspect of the present invention is packing jigs or packing blocks suitable for inclusion within containers such as those described herein. These jigs or blocks can be placed substantially anywhere, in any number of orientations, within the container, as governed by the size and shape of the objects to be stored within the container. Typically, such spacing jigs or spacing blocks can be placed on the interior bottom of the container, on the interior walls of the side walls, back panel, or front panel, or combinations of such placements.

DESCRIPTION OF THE FIGURES

The following figures form part of the present specification and are included to further demonstrate certain aspects of the present invention. The invention may be better understood by reference to one or more of these figures in combination with the detailed description of specific embodiments presented herein.

The figures referenced to above are not drawn necessarily to scale and should be understood to present a simplified representation of the invention, illustrative of the basic aspects involved. Some features of the reusable container depicted in the drawings have been enlarged or distorted relative to others in order to facilitate explanation and understanding. The same reference numbers are used in the drawings for similar or identical components and features shown in various and alternative embodiments. Reusable shipping containers as disclosed in the figures above, and in the detailed description herein, will have configurations and components determined, in part, by the intended application and environment in which they are used.

Definitions

The following definitions are provided in order to aid those skilled in the art in understanding the detailed description of the present invention.

"Wood-based composite panel", as used herein, refers to structural or non-structural product formed from a variety of materials including wood and/or wood substrate products (e.g., flakes or strands of wood, as well as veneers of wood). These materials are optionally formed from moisture-containing substrates, permeable substrates, and substrates which are both moisture-containing and permeable. Suitable wood-based composite panels include, e.g., oriented strand board (OSB) and plywood.

"Flake", as used herein, refers to a thin stand of wood that is produced from a flaker. In addition, as used herein, flake can also refer to "green flake", known to those of skill in the art as a flake that has not been dried. The flake can have any suitable size, provided the flake can be effectively cured with a suitable resin. For example, the flake can typically have a length (y-dimension) of up to about 12 inches (30.4 cm) or about 4.5 inches (11.4 cm) to about 6.0 inches (15.2 cm) and can typically have a width (x-dimension) of up to about 12 inches (30.4 cm) or about 1.5 inches (3.8 cm) to about 2.5 inches (6.4 cm). Likewise, the flake can typically have a thickness (z-dimension) of about 0.001 inches (0.0025 cm) to about 0.10 inches (0.254 cm), about 0.010 inches (0.0254 cm) to about 0.060 inches (0.1524 cm), or about 0.020 inches (0.0508 cm) to about 0.030 inches (0.076 cm). Typically, the width of the flake will be a function of the length of the flake. The length of the flake is typically at least about three times greater than the width of the flake. This allows for proper flake orientation and an OSB with acceptable physical properties.

"Oriented Strand Board", or "OSB", as used herein, refers to an engineered structural-use panel typically manufactured from thin wood strands bonded together with resin under heat, pressure, and/or radiant energy. The strands are typically dried, blended with resin and wax, and formed into thick, loosely consolidated mats or blankets that are pressed under heat and pressure into large panels. The strands in the core layers are usually aligned perpendicular to the strand alignment of the face layers, like the cross-laminated veneers of plywood. It is appreciated that those of skill in the art understand that OSB is typically characterized by those starting materials or intermediate components useful in making the OSB, e.g., resin and flakes of wood. While these materials may undergo a substantial conversion during the manufacturing of the OSB, reference to OSB as including these materials or components is acceptable and appropriate to those of skill in the art. For example, each of the flakes of wood and the resin, during the pressing step (e.g., curing), can undergo a chemical and/or physical conversion such that they will no longer expressly and literally meet the criteria to be classified as a resin and a flake of wood. Reference to the OSB as including a resin and flakes of wood is, however, acceptable and appropriate to those of skill in the art. As such, as used herein, "oriented strand board" includes resin and flakes of wood.

"Plywood", as used herein, refers to a laminate wood-based composite material manufactured from thin wood veneers (i.e., laminates) bonded together with resin under heat and pressure. It is appreciated that those of skill in the art understand that plywood is typically characterized by those starting materials or intermediate components useful in making the plywood, e.g., resin and veneers of wood. While these materials may undergo a substantial conversion during the manufacturing of the plywood, reference to the plywood as including these materials or components is acceptable and appropriate to those of skill in the art. For example, each of the veneers of wood and the resin, during the pressing step (e.g., curing), can undergo a chemical and/or physical conversion such that they will no longer expressly meet the criteria to be classified as a resin and a veneer of wood. Reference to the plywood as including a resin and veneers of wood, however, is acceptable and appropriate to those of skill in the art. As such, as used herein, "plywood" includes resin and veneers of wood.

Suitable plywood, and methods for making the same are disclosed, e.g., in "Engineered Wood Products, A Guide for Specifiers, Designers and Users," Stephen Smulski, Ph.D, Editor in Chief, PFS Research Foundation, Madison, Wis. especially Chapter 2, *Plywood* by Michael McKAy; or "Wood Handbook: Wood as an Engineered Material", reprinted from Forest Products Laboratory General Technical Report FPL-GTR-113 with consent of the USDA Forest Service, Forest Products Laboratory, especially Chapter 10-6, "Wood Based Composites and Panel Products, Plywood". Specifically, the plywood can be any suitable plywood as manufactured by, e.g., Georgia-Pacific, Boise-Cascade, Norbord Industries, Willamette, Roseburg Forest Products, Louisianna-Pacific, Weyerhaeuser, Hood Industries, Plum Creek, or Hunt Plywood Co.

"Surface", as used herein, refers to the outermost boundary of a substrate (e.g., flake, veneer, OSB, or plywood). The surface includes the top surface, the bottom surface and optionally the side surfaces, such as in reference to the sides of the containers described herein.

DETAILED DESCRIPTION OF THE INVENTION

This invention generally relates to a reusable shipping container for shipping and storing fragile items and the like, such as artwork and mirrors, the container having at least one, typically two (or more) hingeable lids. More specifically, a housing is provided having bottom-, end-, and side-walls defining a generally polygonal-shaped interior cavity. Corresponding pairs of vertical ribs can optionally be attached to the interior of each of the sidewalls for added rigidity in the container. Packing jigs or spacing ribs can also be optionally included in the container, being removably attached in a substantially parallel manner relative to each other on opposing ends of the interior of the bottom of the container. Advantageously, it has been found that the use of resusable shipping containers as described herein minimize damage to fragile items being shipped or moved from one location to another. Such containers can be permanently mounted within a transporting vehicle or can be mobile. They can be manufactured in any dimension suitable for transporting different sized articles. Though the invention may have many uses, its typical use is in the moving industry to ship and/or store items.

In a first aspect of the present invention, a container is described, comprising a pair of opposed side panels; a bottom panel extending between the lower side edges of the side panels; a back panel extending substantially perpendicular to the bottom panel and extending substantially perpendicular to the side panels; a lower front panel extending substantially perpendicular to the bottom panel and extending substantially perpendicular to the side panels; an upper front panel co-planer to the lower front panel attached to the lower front panel with a means to allow the upper front panel to hingeably rotate; and a top panel substantially parallel to the bottom panel attached to the back panel with a means to allow the top panel to rotate out of parallel with the bottom panel.

In a second aspect of the present invention, a container is described, wherein the container comprises a pair of opposed side panels, a bottom panel extending between the lower side edges of side panels, a back panel extending substantially perpendicular to the bottom panel and extending substantially perpendicular to the side panels, a lower front panel extending substantially perpendicular to the bottom panel and extending substantially perpendicular to the side panels and substantially parallel to the back panel, and a top panel hingeably attached to the upper edge of the back panel and comprising a first and second top panel, wherein the first and second top panel are attached with a means which allow both the first top panel and the second top panel to hingeably rotate, wherein in the closed position the first top panel is substantially parallel to the bottom panel, and the second top panel extends downwardly and contacts the lower front panel in a way such that the second top panel is substantially parallel to the back panel and substantially co-planar with the lower front panel.

Figure 1:
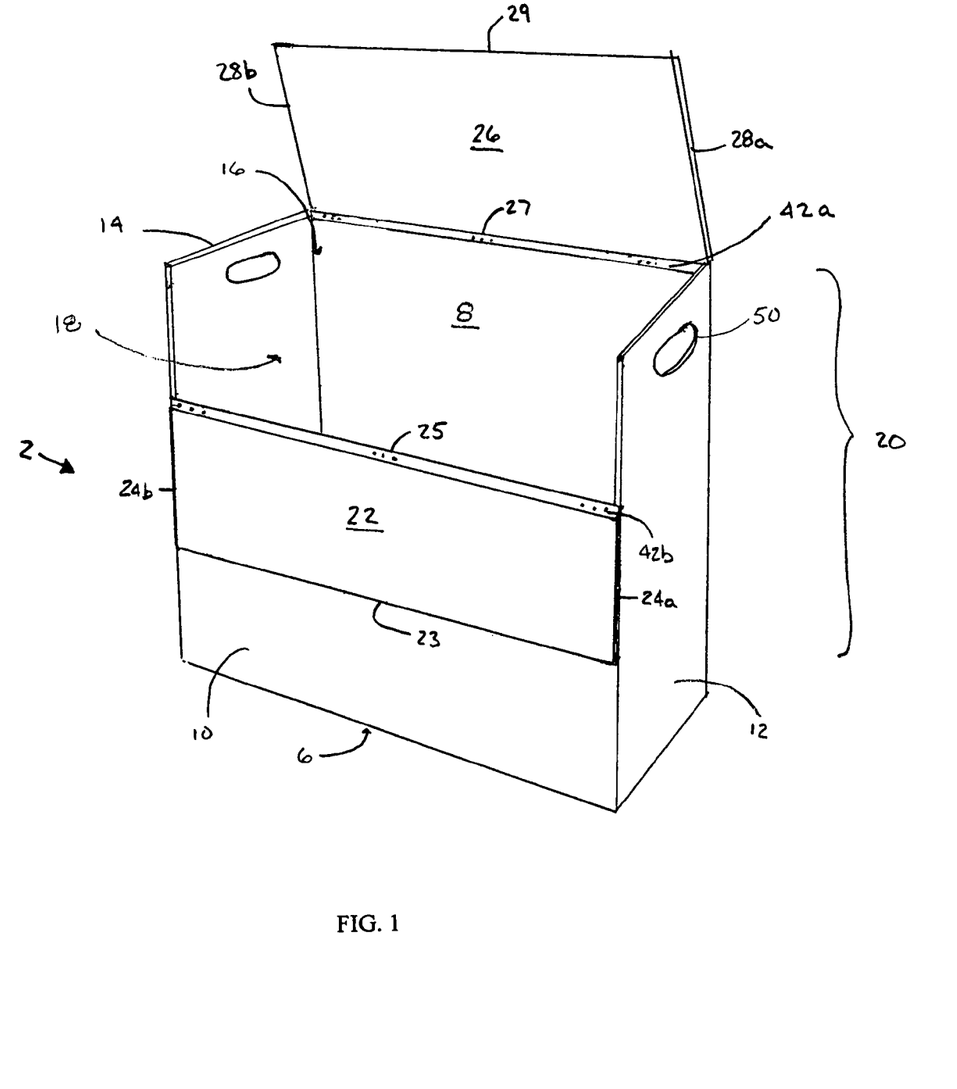
FIG. 1 illustrates a schematic perspective view of a container according to one aspect of the present invention, in a partially open position.
Figure 2:
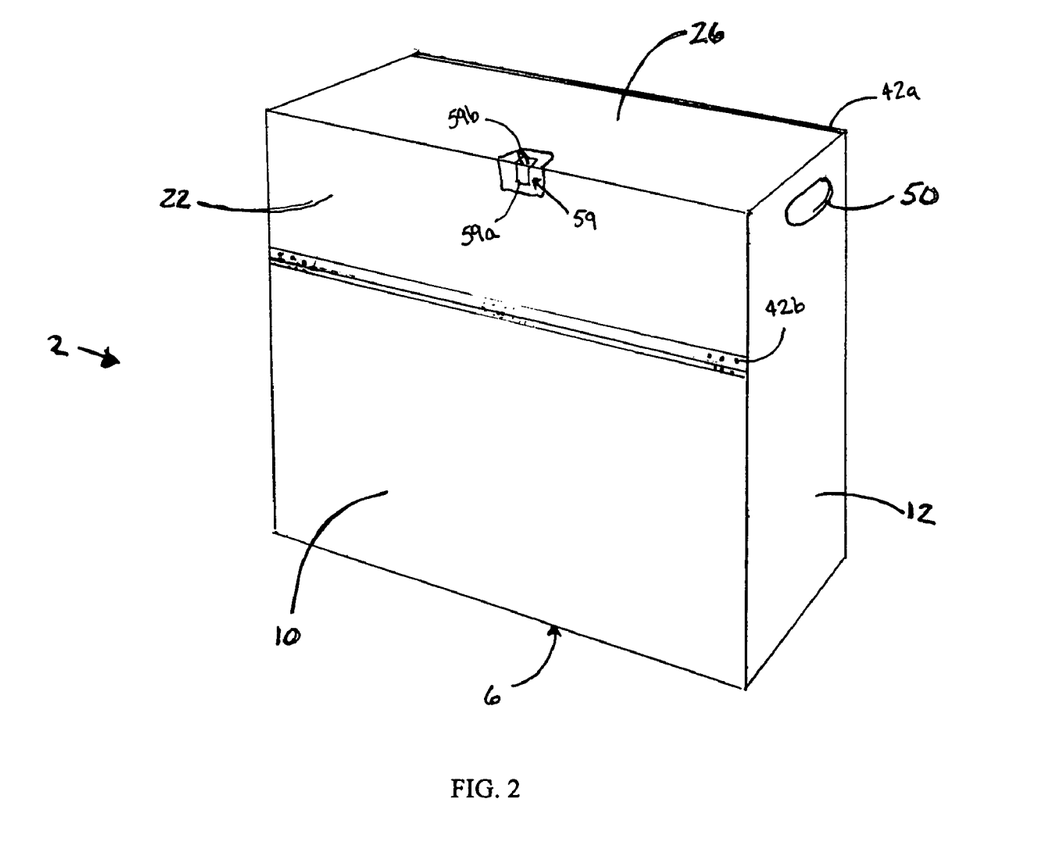
FIG. 2 illustrates a perspective view of a container according to FIG. 1 with the lid in a closed position.

FIG. 1 illustrates a typical aspect of the reusable shipping container 2 of the present invention. Container 2 has a lid 26, and a receptacle 20. Receptacle 20 has a base 6 which serves as the lower support for receptacle 20. The base 6 is generally rectangular or square in shape. Receptacle 20 further comprises a pair of upstanding and opposed, substantially parallel end walls 12 and 14, back side wall 8, and front side wall 10. Both the sidewalls and the end walls are oriented at an angle of about 90° relative to base 6, making them substantially perpendicular to base 6. The combination of sidewalls 8 and 10, and end walls 12 and 14, form the rectangular top opening 16 of the receptacle portion (20) of container 2. Container 2 can further comprise optional handles 50 on opposed end walls 12 and 14, so as to make movement of container 2 easier. Handles 50 can be simple hand holes cut into the sides of end walls 12 and 14 as shown in FIGS. 1 and 2, or they can be attachable handles such as rope handles, preformed handles of metal, plastic, or any number of suitable polymeric materials, and similar handles known in the art which can be attached to the exterior face of end walls 12 and 14 using any suitable attachment means (e.g., screws, nails, glue, etc.). In the instance that the container 2 is formed from plastic, the handles 50 can be a part of the end walls of the container as it is formed. Further, while not shown in FIG. 1, it is envisioned that container 2 can optionally comprise wheels that are mounted to the exterior face of bottom 6, allowing for easier movement of the container, especially when it is fully loaded.

As is illustrated in FIG. 1, front sidewall 10 is of a lower height than back sidewall 8 and end walls 12 and 14. This is so that objects to be inserted into receptacle 20 of container 2 can be more easily inserted, without having to lift them as high. This is especially advantageous when trying to insert large, awkward, and/or heavy objects into container 2 through rectangular front opening 18. While not intending to be limited in scope, front sidewall 10 and back side wall 8 are typically in a height ratio ranging from about 1.0:2.0 to about 1.9:2.0, including from about 1.1:2.0, about 1.2:2.0, about 1.3:2.0, about 1.4:2.0, about 1.5:2.0, about 1.6:2.0, about 1.7:2.0, about 1.8:2.0, and about 1.9:2.0. For example, front wall 10 can be 36 inches tall and back wall 8 can be 48 inches tall. By having front wall 10 lower than either of the two end walls 12 and 14 and back wall 8, a front opening 18 is created which aids in inserting or removing objects from receptacle 20 of the container.

With continuing reference to FIG. 1, container 2 is illustrated having two hingeable lids, top lid 26 and front door 22.

Front door 22 includes hinge edge 25 along hingeable means 42b, first side edge 24a, second side edge 24b, and end edge 23. Top lid 26 includes hinge edge 27 along hingeable means 42a, first side edge 28a, second side edge 28b, and front edge 29. Hinge edge 25 of front door 22 is pivotably and rotatably secured to the top edge of front wall 10 by hingeable means 42b. Similarly, hinge edge 27 of top lid 26 is pivotably and rotatably secured to the top edge of back wall 8 by hingeable means 42a. As used herein, the terms hingeable means and hinging mechanism are used interchangeably.

Hingeable means 42a and 42b, as described herein, can be any number of known hingeable means known to those of skill in the art, including but not limited to continuous hinges (also known as piano hinges), standard hinges, strap hinges, butt hinges (including loose joint, narrow butt, welding butt, nylon, spring, and glass hinges), bolt-on hinges, concealed hinges, latch hinges, and the like. In one typical aspect of the present invention, hingeable means 42a and 42b are both continuous hinges (piano hinges), such as those available from Austin Hardware & Supply, Inc. (Buford, Ga.). Hingeable means 42a and 42b can be the same or different (e.g., 42a can be a continuous hinge, and 42b can be a butt hinge). Similarly, hingeable means 42a and 42b joining the two front sections can be independently made of one continuous hinge or made up of a plurality of hinges. The hingeable means can be manufactured from steel (i.e., cold rolled steel), plated steel, non-plated steel, aluminum, stainless steel, brass, or any other suitable material. In the instance that the container is manufactured from a high-density plastic, the hinges can be plastic and can be incorporated into the mold for the container itself.

FIG. 2 illustrates the reusable shipping container 2 of FIG. 1 with top lid 26 and front door 22 in their closed positions, in accordance with one aspect of the present invention. As shown in FIG. 2, securing means 59, which as shown is comprised of securing means 59a and 59b and which may be a latching hasp and staple set, or a similar latching or securing mechanism, is removably attached to the top edge of front door 22 and to the front edge of top lid 26. Typically 58a and 58b are in alignment. As top lid 26 is closed such that it is substantially parallel to bottom 6 and substantially perpendicular to back wall 8 and side walls 12 and 14, it is brought into contact with front door 22 which when closed is substantially perpendicular to 26. Hence, in the instance that securing means 59 is a latching hasp and staple set with 59a being a hasp and 59b being a staple, the hasp 59a will openly connect with staple 59b, resulting in the securing of lid 26 to door 22 and substantially sealing container 2 closed. Optionally, a variety of other securing devices can be used to secure lid 26 to front door 22 and prevent the container 2 from opening unexpectedly and/or provide added security (i.e., from theft) for the objects contained within the container of the present invention.

Figure 3:
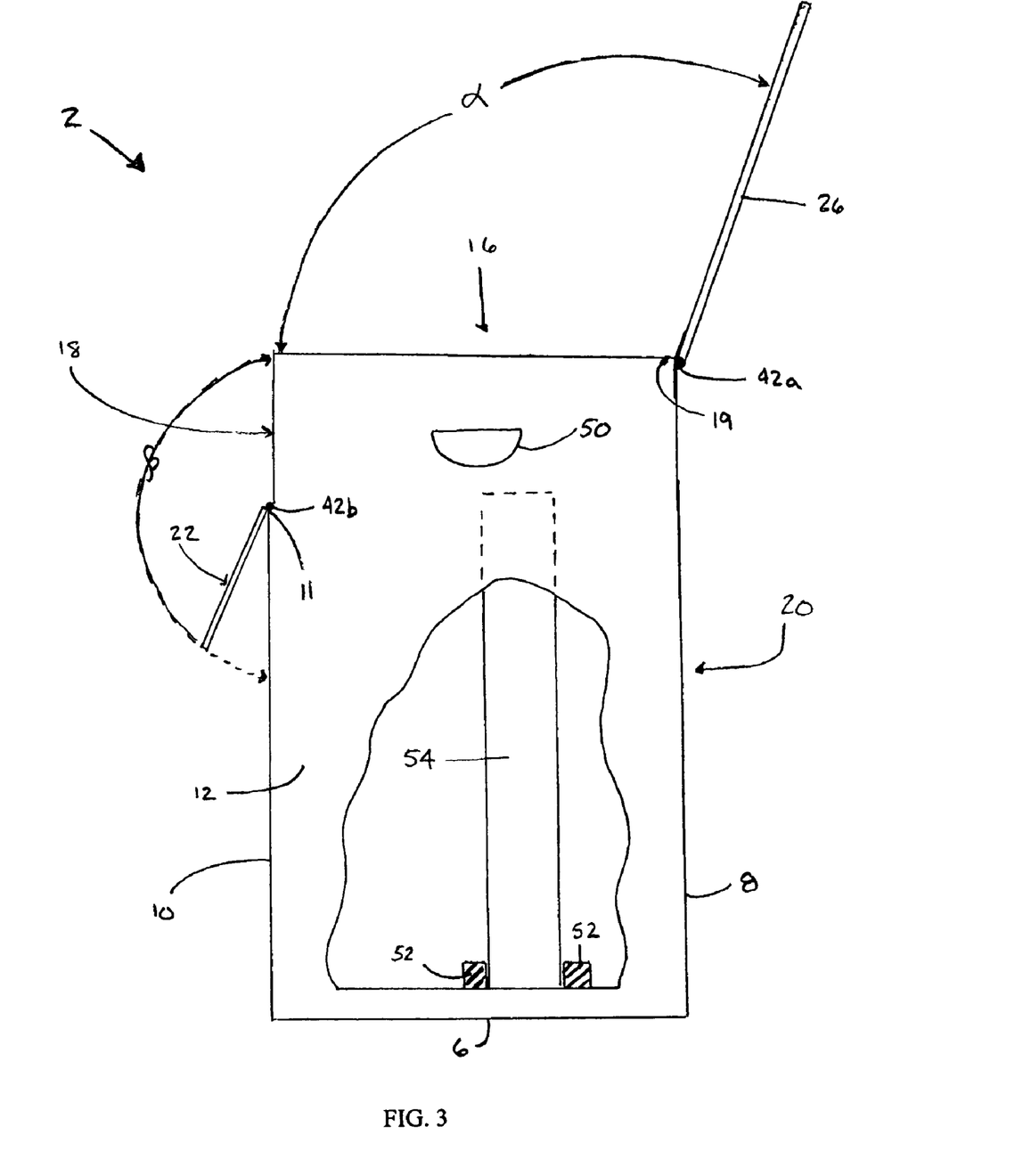
FIG. 3 illustrates a side view of a container according to FIG. 1 with the lid in the fully open position, in accordance with one aspect of the present invention, showing a cut-away view of the interior of the container.

FIG. 3 shows reusable shipping container 2 with the top lid 26 and the front door 22 each in their fully opened position, and partially opened (respectively) positions. In the fully open positions, the receptacle 20 of the open container 2 is fully accessible and is easily loadable, either from the top via substantially rectangular top opening 16, via substantially rectangular front opening 18, or via the use of both openings 16 and 18 in combination, depending upon the size, weight, and nature of the objects to be loaded into the receptacle 20 of the container. As further shown in FIG. 3, top lid 26 when fully open remains rotationally engaged with the upper edge 19 of the back sidewall 8. Similarly, when front door 22 is fully open, it remains rotationally engaged with the upper edge 11 of front sidewall 10. Additionally, it is illustrated that in a typical aspect of the present invention, top lid 26 is prevented from rotating beyond an angle alpha ($\alpha$) of about 110° by the interaction of the hingeable means 42a with back sidewall 8. In an optional aspect of the present invention, top lid 26 can rotate beyond angle alpha shown in the figure, to a point, for example, wherein top lid 26 has rotated to a point such that it is substantially parallel with back sidewall 8. In a similar manner, it is shown that front door 22 rotates throughout angle beta ($\beta$) of about 180° by the interaction of the hingeable means 42b with front sidewall 10, such that when it is open, door 22 is substantially parallel to front sidewall 10, and when it is closed it is substantially co-planar with front sidewall 10.

Figure 4:
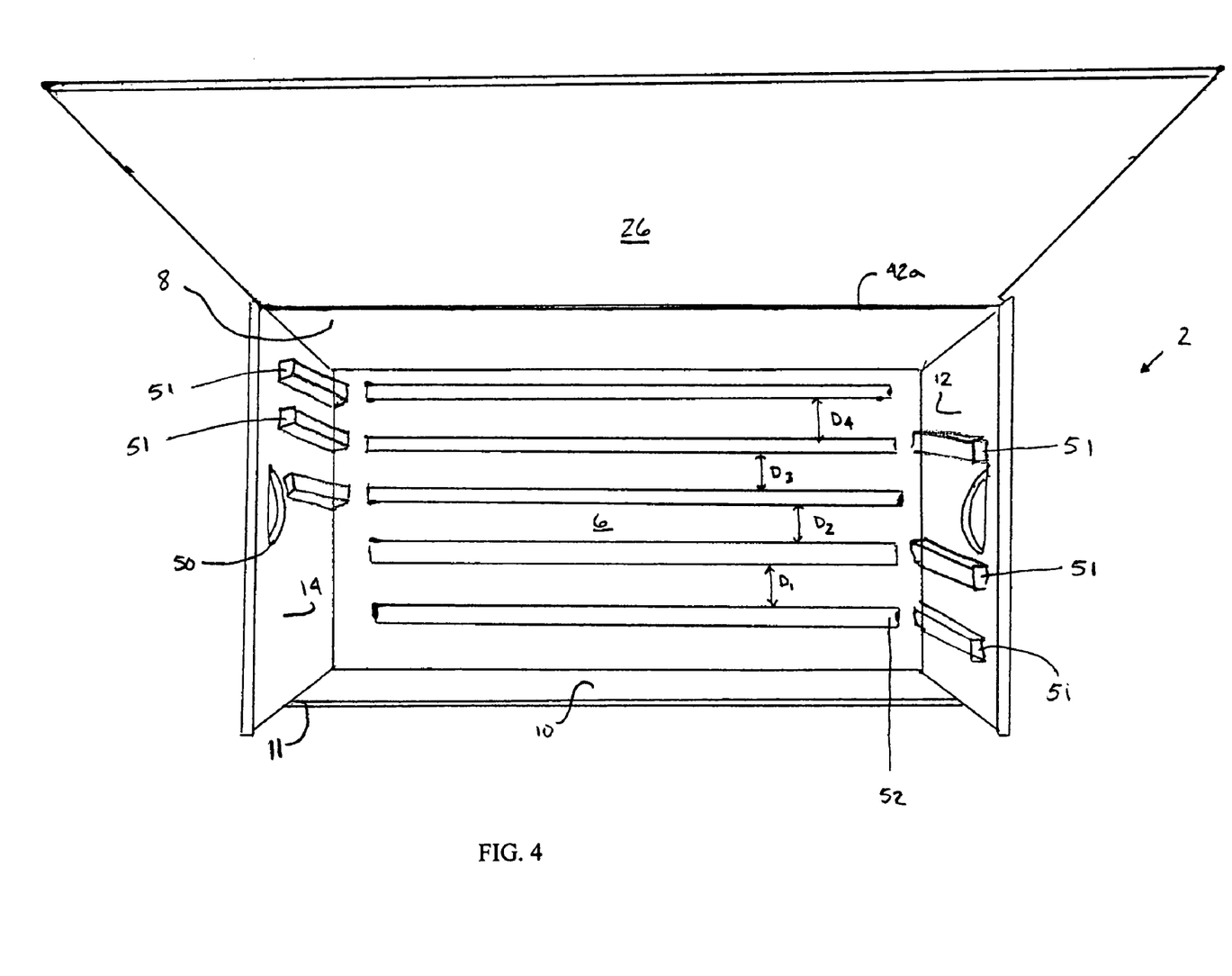
FIG. 4 illustrates a top view of a container according to one aspect of the present invention, with the top open and showing the inclusion of optional spacing blocks.

Referring to FIG. 4, a top plan view of the embodiment of FIG. 1 is shown, in which optional spacing blocks/spacing jigs 52 are illustrated. For the sake of clarity, front door 22 is not illustrated hingeably attached to the upper edge 11 of front sidewall 10. As shown therein, spacing block members 52 are arranged in parallel rows across bottom 6,. with each of the members being offset from each other by some distance, $D_1$, $D_2$, $D_3$ and $D_4$. Distances $D_1$-$D_4$ can be equal or vary, depending upon the size of the objects to be placed between them. Spacing blocks 52 can be permanently attached to bottom 6 of the container, or they can be adjustably placed on the bottom 6 of the container. Additionally, side spacing blocks 51 can also or alternatively be attached to the end walls 12 and 14 of the container. Such side spacing blocks need not be of a fixed width or height, and can alternate in height and spacing as necessary. For example, in one aspect of using the container of the present invention, a first object is inserted into the container, a first spacing block is added, a second object is added such that the first spacing block is between the first and second object, and so on. The presence of such spacing block members 52 and/or 51 within container 2 allows for more protection of the objects placed into the containers for shipping, as they will not directly touch each other, and the spacing provides an area which can be filled with optional, additional packing material. Further, while spacing block members have been shown running substantially parallel with the front and back walls 10 and 8, it is envisioned that they can also run perpendicular to back wall 8 and front wall 10 (and consequently, parallel to end walls 12 and 14).

Figure 5:
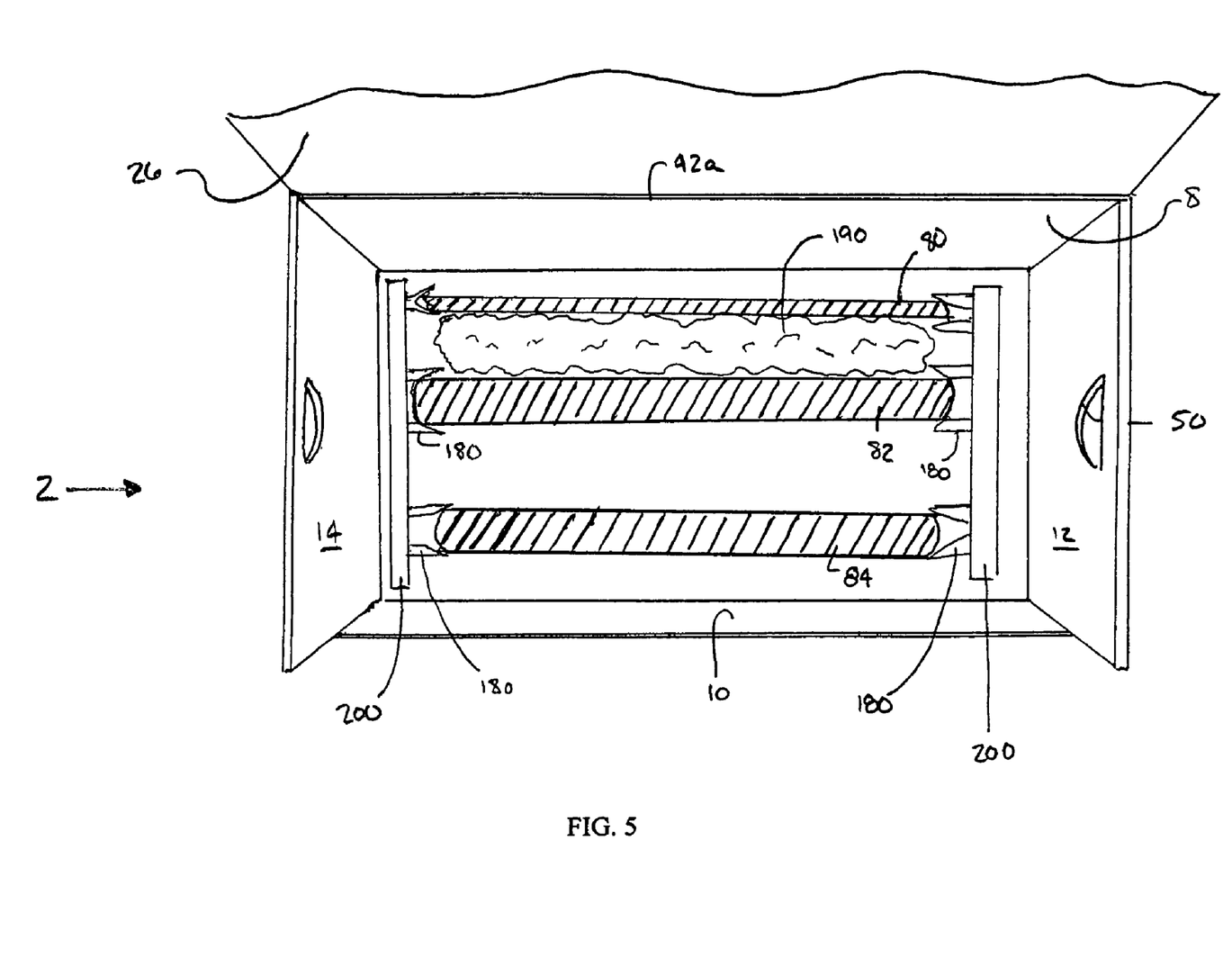
FIG. 5 illustrates a top perspective view of a container in accordance with one aspect of the present invention, showing the inclusion of optional spacing jigs.

An optional feature of the containers of the present invention, as mentioned previously, is the inclusion of one or more packing jigs 200, which can be placed along the bottom 6 of the reusable container 2 as illustrated in FIG. 5. While not shown, such jigs can also be placed along the sides (12 and/or 14) or the back 8 of the container, in any number of orientations. The arrangement, spacing, and orientation of such packing jigs 200 (or spacing blocks 52) will often depend upon the size and nature of the objects to be placed into the box. As shown therein, typically two packing jigs 200 can be used, and are typically arranged in a substantially parallel, spaced apart manner. However, it is envisioned that a plurality of packing jigs could be used in a variety of orientations, depending upon the nature of the objects to be inserted into and transported within a container of the present invention. Such packing jigs 200 can have "guide fingers" 180 which are typically movable and adjustable, allowing for objects of varying thickness to be held within the space created between two guide fingers. As illustrated in FIG. 5, objects 80, 82 and 84 to be transported within container 2 are arranged such that each is held in place by the movable and adjustable guide fingers 180 on packing jigs 200. The use of such jigs allows for objects to be maintained in a substantially upright position with minimal movement within container 2. As is also shown in FIG. 5, optional padding 190, which can be paper, cloth, Styrofoam, burlap, or any other known packing material suitable for use as padding, can be inserted between objects 80 and 82 in order to provide additional protection and further minimize unwanted movement during transport within container 2.

Figure 6:
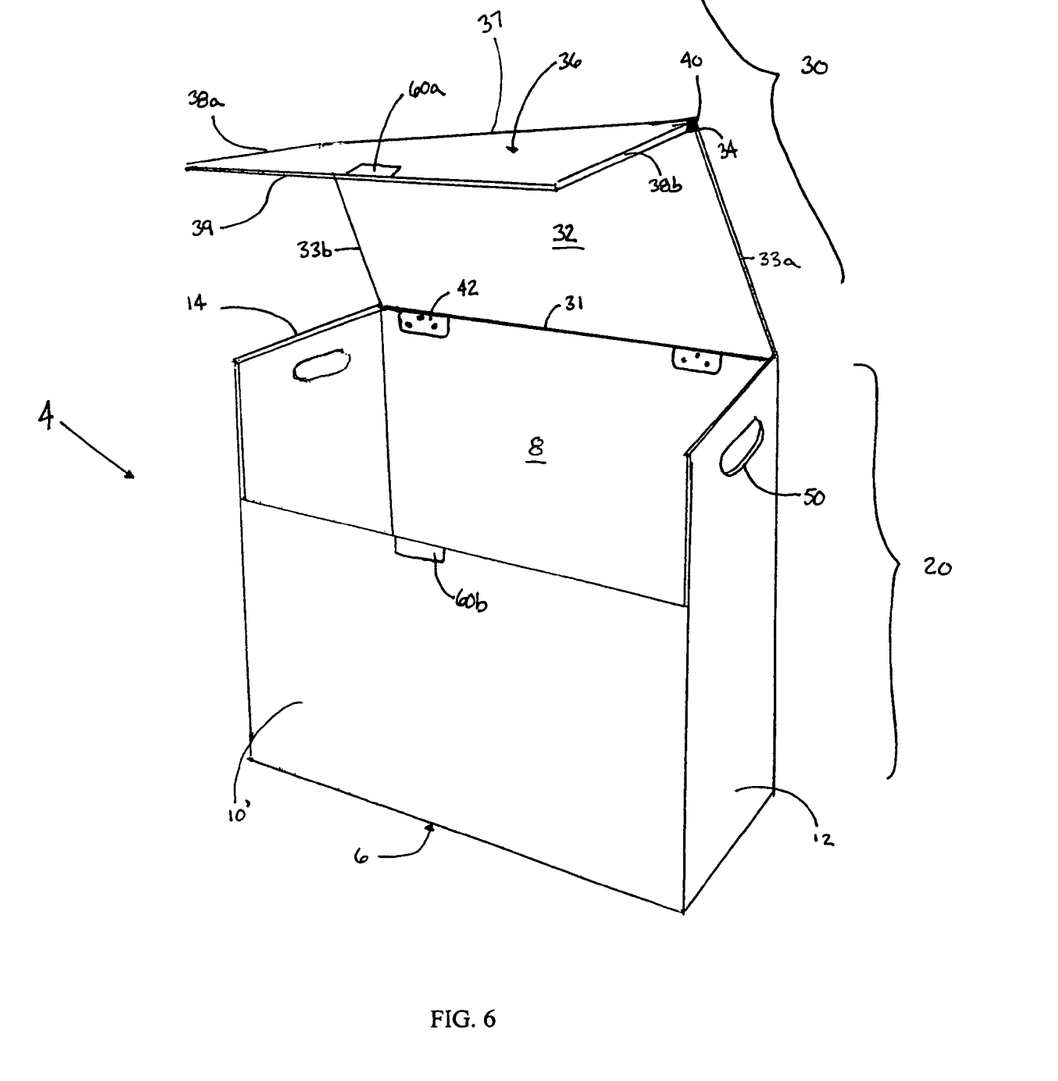
FIG. 6 illustrates a schematic perspective view of a container according to a further aspect of the present invention in a partially open position.
Figure 7:
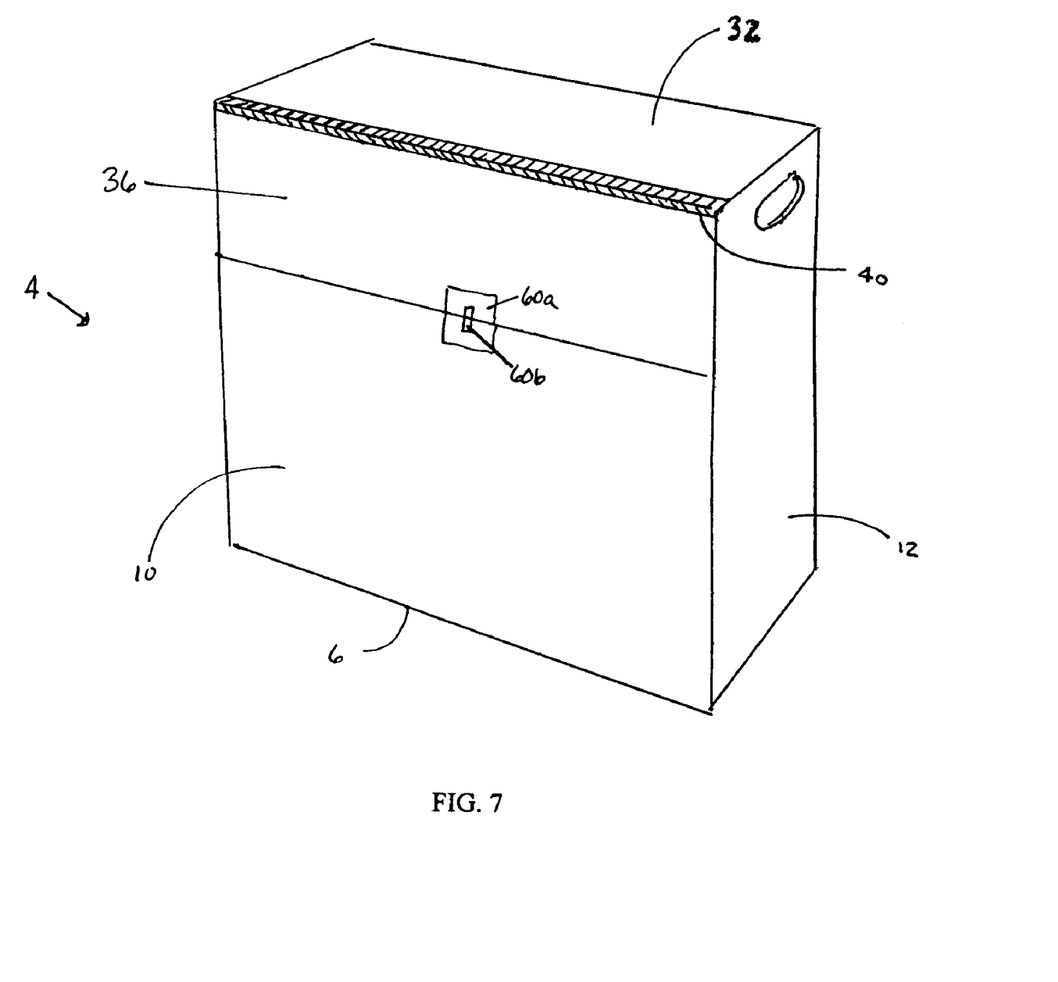
FIG. 7 illustrates a perspective view of the container of FIG. 6 invention with the lid in a closed position.

Turning now to FIG. 6, a further embodiment of the reusable shipping container of the present invention will be described in more detail. Container 4 includes a hingeable bi-fold lid 30 and a receptacle 20. Receptacle 20 has a base 6 which serves as the lower support for receptacle 20. The base 6 is generally rectangular in shape. Receptacle 20 further comprises a pair of upstanding and opposed end walls 12 and 14, back side wall 8 and front side wall 10'. Both the side walls and the end walls are oriented at an angle of about 90 degrees relative to base 6, making them substantially perpendicular to base 6. The combination of sidewalls 8 and 10', and end walls 12 and 14 form the rectangular top opening 16 of receptacle 22. Container 2 can further comprise optional handles 50 on opposed end walls 12 and 14, so as to make movement of container 2 easier. Handles 50 can be simple hand holes cut into the sides of end walls 12 and 14 as shown in FIGS. 6 and 7, or they can be attachable handles such as rope handles, preformed handles of metal, plastic, or any number of suitable polymeric materials, and similar handles known in the art which can be attached to the exterior face of end walls 12 and 14 using any suitable attachment means (e.g., screws, nails, glue, etc.). In the instance that the container 4 is formed from plastic, the handles can be a part of the end walls of the container as it is formed. Further, while not shown in FIG. 6, it is envisioned that container 4 can optionally comprise wheels that are mounted to the exterior face of bottom 6, allowing for easier movement of the container, especially when it is fully loaded.

As is illustrated in FIG. 6, front sidewall 10' is of a lower height than back sidewall 8 and end walls 12 and 14. This is so that objects to be inserted into receptacle 22 of container 4 can be more easily inserted, without having to lift them as high. This is especially advantageous when trying to insert large, awkward, and/or heavy objects into container 4 through rectangular front opening 18. While not intending to be limited in scope, front sidewall 10' and back side wall 8 are typically in a height ratio ranging from about 1.0:2.0 to about 1.9:2.0, including from about 1.1:2.0, about 1.2:2.0, about 1.3:2.0, about 1.4:2.0, about 1.5:2.0, about 1.6:2.0, about 1.7:2.0, about 1.8:2.0, and about 1.9:2.0. For example, front wall 10' can be 24 inches tall and back wall 8 can be 36 inches tall. As indicated previously, by having front wall 10' lower than either of the two end walls 12 and 14 and back wall 8, a front opening 18 is created which aids in inserting or removing objects from the crate.

With continuing reference to FIG. 6, container 4 is illustrated having a hingeable bi-fold lid 30. Lid 30 is comprised of top and front panels 32 and 36, respectively. Top panel 32 is formed with hinge edge 31, first side edge 33a, second side edge 33b, and end edge 34. Front panel 36 is formed with hinge edge 37, first side edge 38a, second side edge 38b, and end edge 39. End edge 34 of top panel 32 is pivotably secured to hinge edge 37 of front panel 36 by hingeable means 40. Edge 31 is pivotally secured to the top edge of back side wall 8 by hingeable means 42. As discussed previously as regards to container 2, hingeable means 40 and 42 can be any number of hingeable means known in the art, including but not limited to continuous hinges, standard hinges, strap hinges, butt hinges, bolt-on hinges, concealed hinges, latch hinges, and combinations of such hinges. Preferably, the hingeable means 40 and 42 are both continuous hinges, such as piano hinges.

FIG. 7 illustrates the reusable shipping container 4 of FIG. 6 with bi-fold hingeable lids 32 and 36 in the closed position, in accordance with one aspect of the present invention. As also illustrated therein, securing mechanisms 60a and 60b are in contact, and may be secured or locked as desired, in order to prevent unwanted opening of bi-fold hingable lid 22. For example, in one aspect of the present invention, securing mechanisms 60a and 60b are a latching hasp and staple set, with 60a being a hasp removably attached to the lower edge of front closing piece 36 and 60b being a staple removably attached to the upper edge of front side wall 10'. Typically, 60a and 60b are in alignment. As bi-fold lid 22 is closed and front closing piece 36 is brought into contact with front side wall 10', 60a and 60b will align, and hasp 60a will removably connect with staple 60b, resulting in the securing of bi-fold hingeable lid 22. Optionally, a padlock or other similar securing device can then be attached to securing mechanism 60a and 60b (i.e., through the staple 60b), further securing lid 30 from opening unexpectedly.

Figure 8:
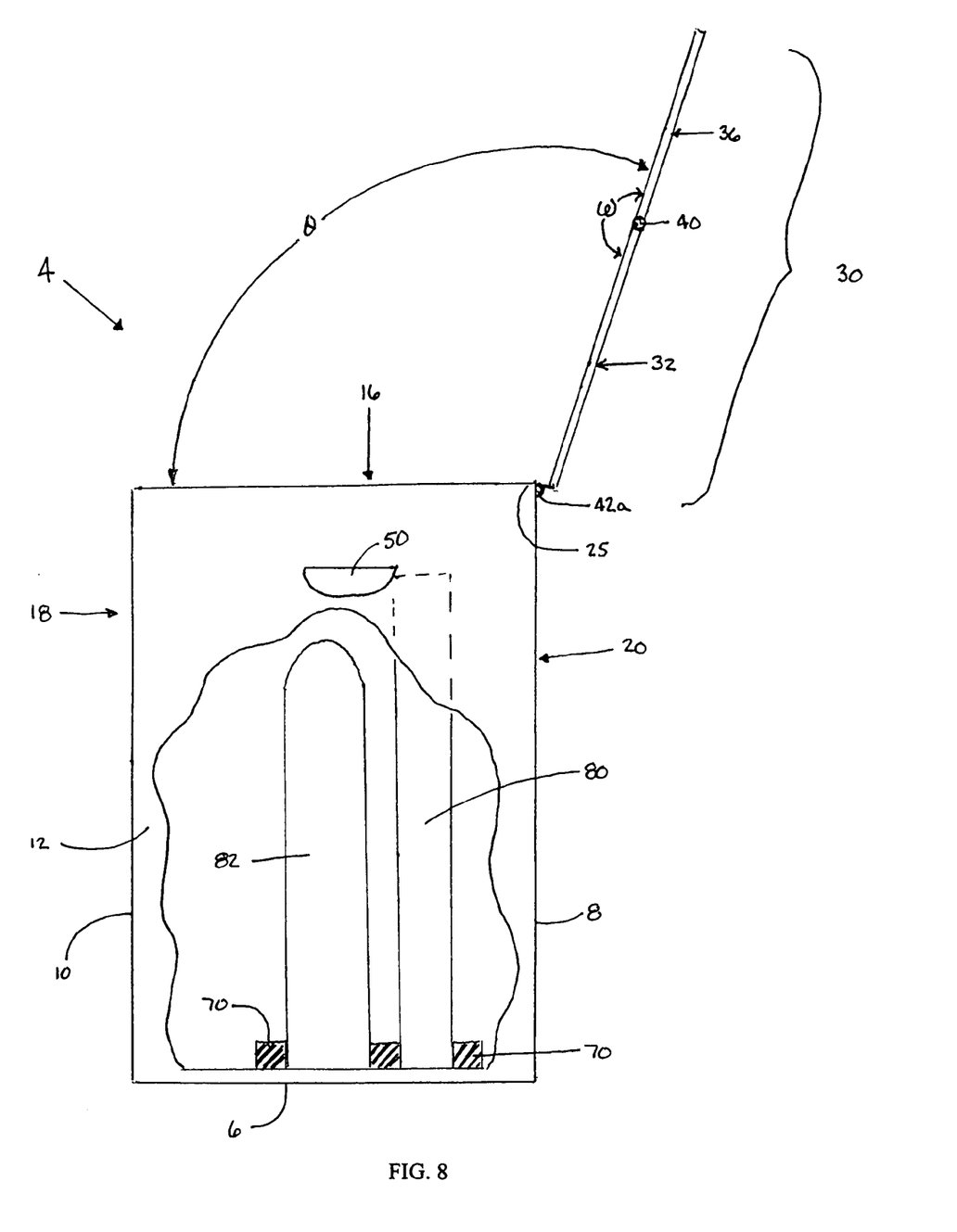
FIG. 8 illustrates a side view of the container of FIG. 6 with the lid in the fully open position, in accordance with one aspect of the present invention, showing a cut-away view of the interior of the container.

Reference is now made to FIG. 8, which illustrates the container 4 with the bifold, hingably connected lids 32 and 36 in a fully opened position. In the fully open position, the receptacle 20 of the open container 4 is fully accessible and is easily loadable, either from the top via the rectangular top opening 16, via rectangular front opening 18, or via the use of both openings 16 and 18 in combination, depending upon the size and weight of the object to be loaded. As shown therein, the lids 32 and 36, when fully open, remain rotationally engaged with the upper edge 25 of the back side wall 8. Further, lids 32 and 36 are prevented from rotating beyond an angle theta ($\theta$) of about 110° by the interaction of the hinging mechanism 42 with back sidewall 8. Similarly, bifold lids 32 and 36, when fully open, remain rotationally engaged with each other, and are prevented from rotating beyond an angle omega ($\omega$) of about 180° by the interaction of the hingeable means 40.

FIG. 8 also illustrates, as shown in the cut-out view of the container 4, one of a plurality of ways in which fragile items, such as mirrors, windows (such as stained glass windows), and artwork can be stored within the container. While not intended to be limited to only two objects, as shown in FIG. 8, objects 80 and 82 (which can be fragile items such as mirrors, or artwork, or combinations thereof) can be placed substantially upright in receptacle 20 of container 4, such that they are parallel, or substantially parallel, to each other. They also are typically insertably placed into receptacle 20 in a manner so that at least a portion of at least one of the surfaces of objects 80 and 82 is perpendicular to, or substantially perpendicular to, the inner surface of bottom 6.

In one aspect of the present invention, objects 80 and 82 can be insertably placed into receptacle 20 in a manner such that they are in direct contact with each other (i.e., with no spacing between them). Optionally, and equally acceptable, container 4 can contain spacing blocks or spacing jigs 70. Such blocks are typically removably attached to the inner surface of bottom 6, as shown in FIG. 3, and provide adjustable spacing for accommodating objects of various thickness and size. Such spacing blocks or spacing jigs 70 can also serve the purpose of "clamping" the objects into position within container 4 so as to add yet another level of security to the transport of fragile/valuable objects. Blocks 70 can be arranged within container 4 in a substantially parallel manner, and can be oriented parallel to back and front side walls 8 and 10', can be oriented parallel to end walls 12 and 14, or in a variety of combinations thereof, depending on the objects to be stored and transported within container 4.

Reusable containers 2 or 4 can be manufactured from a variety of materials, including but not limited to wood such as plywood (including veneer core, lumber core, particle board core (PBC), melamine, and MDF-core plywood) of any grade (AA-E) or material (e.g., birch, maple, oak, cherry, pine, etc.), OSB, MDF (Medium-Density Fiber core plywood), flake board, and combinations thereof; metal, such as steel, galvanized steel, aluminum, or metal alloys; asbestos; or plastic, such as high density plastics like polyethylene (HDPE), recycled HDPE, polyurethane, polyvinylchloride (PVC), thermoplastics, thermoplastic olefins (TPOs), polymers and copolymers such as impact copolymers, random copolymers, block copolymers, or the like. Such plastics, if used, can be formed into containers 2 (or 4) of the present invention using a variety of methods known to those of skill in the art, including but not limited to blow molding, extrusion, profile extrusion, sheet extrusion, rotational molding, and injection molding. Further, such containers made of any of the above-recited materials can be of any thickness, as appropriate for the end-use. Typical thicknesses for plywood include ¼", ½", ¾", ⅜", and 1", any of which can be used to manufacture the containers of the present invention.

The interior of the containers of the present invention, such as containers 2 and 4, can be padded or unpadded, but will typically be padded to allow extra protection to the articles being transported. Such padding can be made of foam, plastic, cloth, carpet padding, corrugated paper, bubble wrap, or the like. The containers as described herein are readily stackable, if necessary, in order to maximize space usage in a shipping container or a moving vehicle.

In one embodiment, the invention was made of plywood. The front was four feet by four feet and the sides approximately four feet tall and twelve inches wide. The top was hinged to the back of the container using a continuous piano hinge, and another continuous piano hinge was used to join the front top section and the bottom front section approximately eighteen inches from the top of the container. To join the top front section to the top, two hasp type fasteners were used. The interior was lined with typical carpet padding. Such container would be suitable to transport mirrors, pictures and the like.

Figure 9:
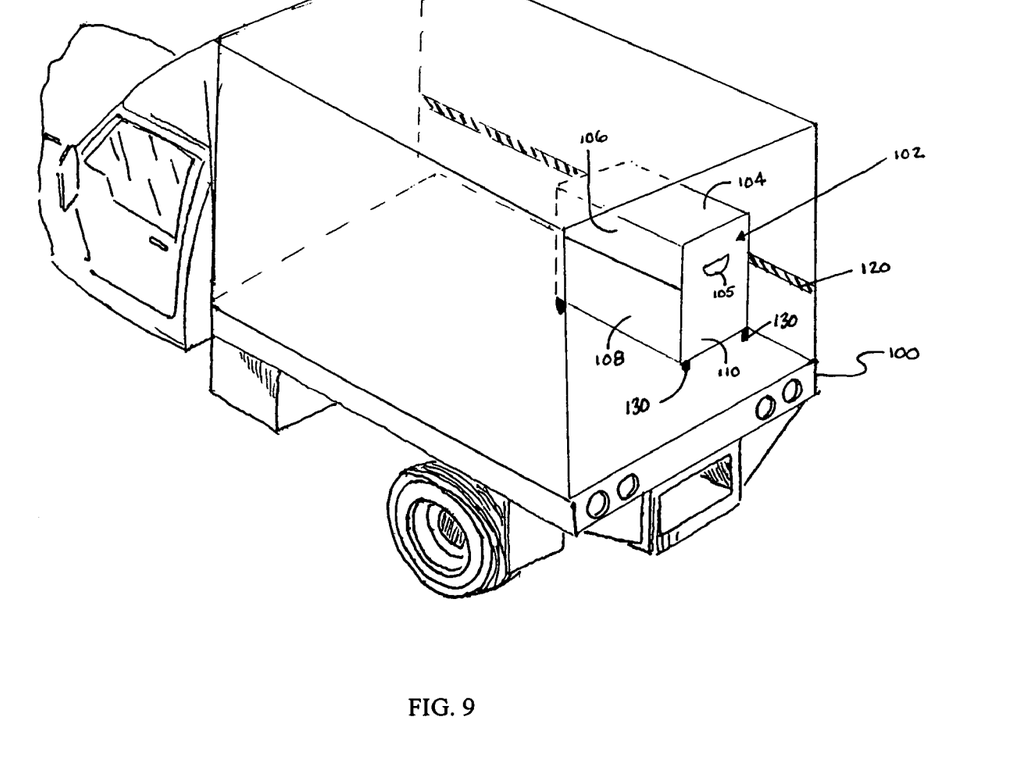
FIG. 9 illustrates a perspective view of a vehicle with a container as described herein, having a hinged lid in accordance with aspects of the present invention.

FIG. 9 is a perspective view of a vehicle 100 (embodying herein a moving truck) containing a reusable container 102 in accordance with one aspect of the present invention. Vehicles, such as vehicle 100, have the capacity to utilize one or more containers 102 to carry cargo such as artwork, fragile items such as mirrors, and numerous other merchandise which often need extra protection to ensure their safe transport from one point to another. In the illustrated embodiment of the invention shown in FIG. 9, the container 102 is shown in a typical position within vehicle 100. Container 102 has handles 105 on one or both opposing end walls 110, for ease in movement onto and off of vehicle 100. As further shown therein, container 102 can optionally be fitted with wheels or casters 130 in order to enable easy movement of the container onto and off of the vehicle, as well as from one location to another (i.e., from a house out to a moving vehicle parked outside in a driveway). In a typical transport-ready state, container 102 has top lid 104 and front lid 106, which doors hingably connected to the back and front panels of the box as described previously, closed as illustrated within the figure. Typically, front lid 106 is sealed or locked in connection to top lid 104 using any of a variety of known locking or coupling devices (i.e., a padlock) or one or more hasps (metal fasteners with one or more hinged slotted parts that fit over a staple and are secured by a pin, bolt, padlock, etc). As further shown in FIG. 9, container 102 can be placed against, and attached to, support rails 120 of vehicle 100, in order to prevent movement of the container during transport. Such attachment can be by any number of known attachment means, including but not limited to ropes, cables, bungees, and the like.

Figure 10:
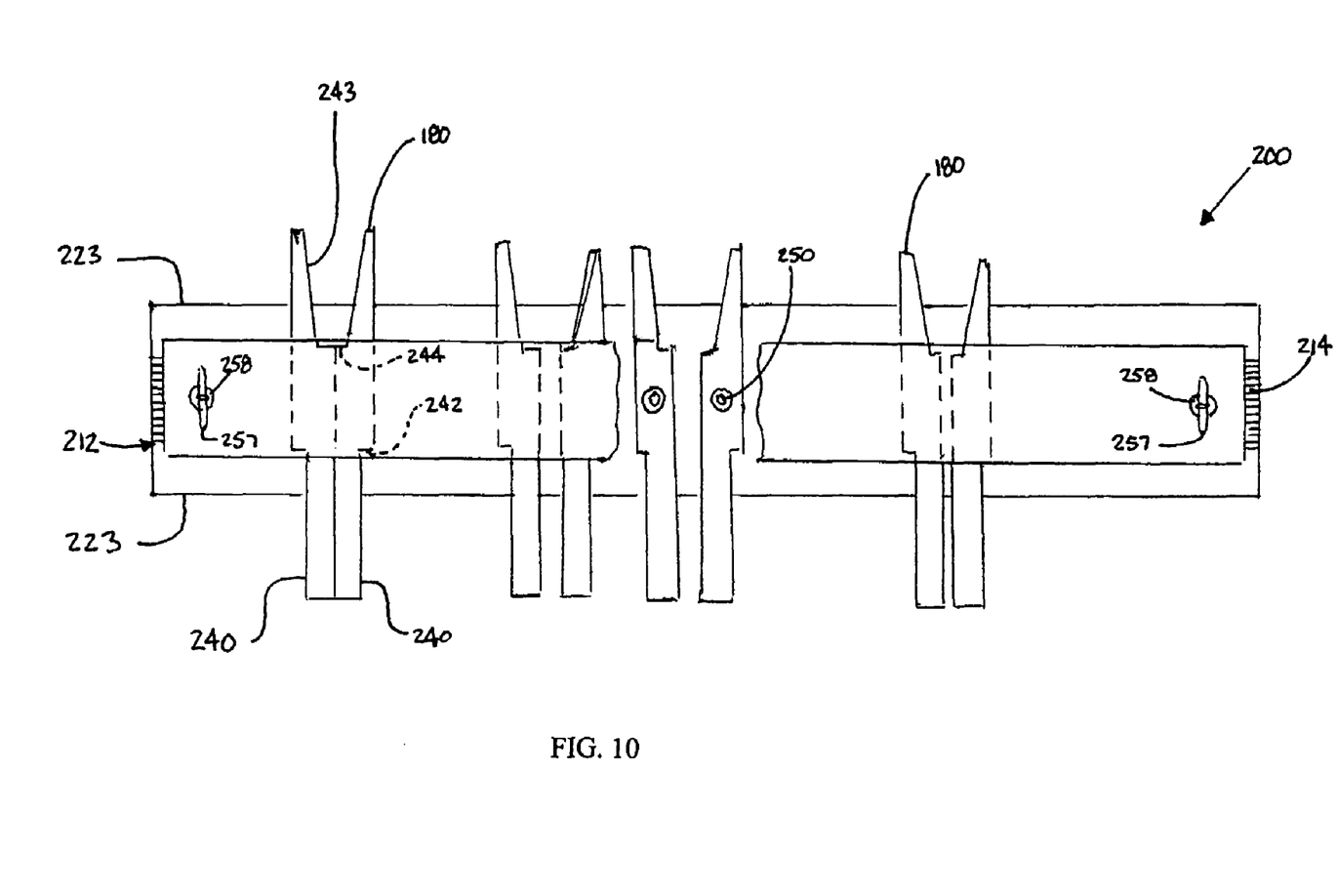
FIG. 10 illustrates a plan view of a spacing jig for use in association with a container of the present invention with parts broken away.

The transversely extending "guide fingers" generally indicated at 180 in previously-described FIG. 5 are adapted to be arranged in pairs as best shown in greater detail in FIG. 10. As illustrated therein, the opposite ends of the fingers which are reduced in width from center portions of the fingers, can be seen to project a short distance beyond the side faces 223 of the base frame. The opposite ends of each pair of fingers overhanging one side of the frame 212 are shaped to provide guiding surfaces 240 which are parallel to one another. Stops 242 are provided by the center portions at the inner ends of the surfaces. 240, the aligned stops being disposed at right angles to those surfaces. Along the other side of the base frame, the opposite ends of each pair of fingers are shaped to provide inwardly converging guiding surfaces 243. The angled surfaces 243 terminate in stops 244 which are aligned with one another and therefore parallel to the stops 242 as well as to the longitudinal axis of the base frame.

Figure 11:
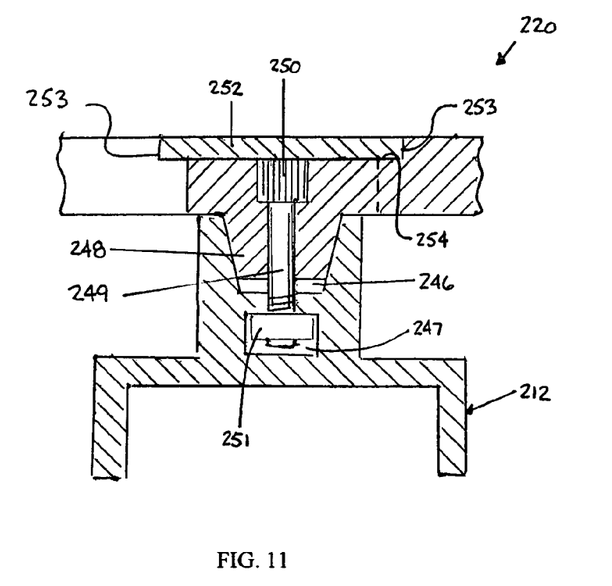
FIG. 11 illustrates an enlarged detail section of an optional bottom securing means of the spacing jig of FIG. 10, showing the means on a jig for securing a plurality of objects between guides in selected positions.

Each guide finger 180 is separately secured to the support 214 by the means which has been generally indicated at 220. As best shown in FIG. 11, the securing means 220 comprises an inwardly tapering groove 246 that is formed in the upper edge of the support 214 (not shown) to extend between the end edges 225 of the base frame. An inverted T-shaped passageway 247 is also formed in the support to connect with the bottom of the groove 246. The guide fingers are each provided below their center portions with a depending boss 248 which is tapered in the same manner as the groove so that a wedging action is achieved. A capscrew 249 extends through the center of each finger and the threaded lower end of this fastener projects into the passageway 247. The capscrews 249 each have a socketed head 250 which is enterable from the top of the finger and the bolt is fitted with a square nut 251 which is slidably but nonrotatably received in the passageway 247. Thus, the fingers 180 are supported parallel to one another with the guiding surfaces 240 at right angles to the longitudinal axis of the base frame 212. The fingers are independently movable along the support when their capscrews 249 are slacked off a few turns and each finger can be secured in a selected position by tightening the capscrew by a tool applied to the head 250. Since the tapered boss 248 is lodged in a correspondingly tapered groove 247, the securing means 220 will be seen to provide means for locating and maintaining each guide finger with the longitudinal axis of the finger at right angles to the corresponding axis of the base frame.

The uppermost edges of the plurality of guide fingers lie in a common horizontal plane and it is along the supporting surface provided by these edges that packed, fragile items for transport within the container of the present invention can be placed and thereby held by the packing jig. In order to span the spaces between the guide fingers, the jig 200 preferably is provided with a slide plate 252 having parallel side edges 253. The flat plate 252 is inset into recesses 254 formed in the fingers 180, the plate combining with the uppermost edges of the fingers to provide the required even surface for slidably supporting the fragile/transportable objects.

Figure 12:
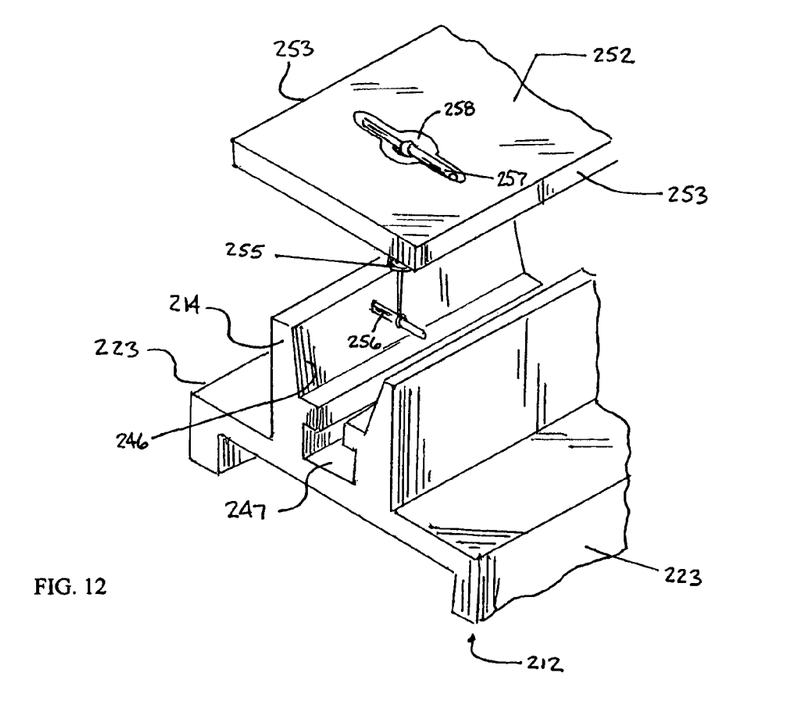
FIG. 12 illustrates a perspective view of a portion of the jig of FIG. 10, showing a corner of a base frame and an end view of a slide plate for an optional bottom securing means and spacing jig.

Slide plate 252 terminates short of the end edges 225 of the base frame and it is desirable that the terminal ends of the plate be secured in some manner to the frame 212. One such arrangement is shown best in FIG. 12 to comprise a spring 255 which is fitted at opposite ends with a latch pin 256 and a toggle 257. A recessed opening 258 is formed in the upper face of the plate to house the toggle. A similar fastening arrangement, not shown, is provided at the other end of the slide plate so that the plate is releasably secured to the support 214 to extend over the guide fingers without projecting above the uppermost edges of those fingers.

While fingers 180 as shown in the figures herein are depicted to substantially pyramidal and pointed in shape, their illustration as such is in no means meant to limit their shape. Fingers 180 suitable for use with packing jig 200 can be of any polygonal shape necessary in order to releasably retain objects within reusable containers 2 or 4 of the present invention. Such shapes include, but are not limited to, square, rectangular, and round.

The invention has been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intends to protect all such modifications and improvements to the full extent that such falls within the scope or range of equivalent of the following claims.

What is claimed is:

1. A reusable shipping container, comprising:
   a first top lid;
   a second frontal lid; and
   a receptacle having a base, two parallel and spatially opposed end walls, a bottom member, a back side wall, and a front side wall, wherein the back side wall and the front side wall are parallel and spatially opposed to each other, and wherein the bottom member is oriented substantially perpendicular to the end walls, back side wall, and front side wall,
   wherein:
      the front side wall is shorter than the back side wall;
      the first top lid is hingeably attached to the back side wall; and
      the second frontal lid is hingeably attached to the front side wall, and
   wherein the shipping container further includes a plurality of spacing block members extending substantially the entire distance between two oppositely-spaced walls and arranged in a parallel orientation across the bottom member, each of the block members being in contact with the bottom member of the shipping container and offset from each other by an adjustable distance.

2. The reusable container of claim 1, wherein the first top lid is hingeably attached to the back side wall with a continuous hinge.

3. The reusable container of claim 1, wherein the second frontal lid is hingeably attached to the front side wall with a continuous hinge.

4. The reusable container of claim 1, further comprising handles on the end walls.

5. The reusable shipping container of claim 1, further comprising one or more spacing block members in contact with at least one end wall of the container.

6. The container of claim 1, further comprising a plurality of wheels attached to the outside surface of the base of the container.

7. The container of claim 1, wherein the container is made from plywood, OSB, flake board, wood-based composite materials, or combinations thereof.

8. The container of claim 1, wherein the container is made from high density plastic.

9. A reusable container for transporting fragile articles, the container comprising:
   (a) a pair of opposed end panels;
   (b) a bottom panel extending between side edges of the end panels;
   (c) a back panel extending substantially perpendicular to the bottom panel and extending substantially perpendicular to the end panels;
   (d) a lower front panel extending substantially perpendicular to the bottom panel and extending substantially perpendicular to the end panels;
   (e) an upper front panel co-planer to the lower front panel attached to the lower front panel with a first hingable means to allow the upper front panel to rotate; and
   (f) a top panel substantially parallel to the bottom panel attached to the back panel with a second hingable means to allow the top panel to rotate out of parallel with the bottom panel
   wherein the container further includes one or more spacing block members extending substantially the entire distance between two oppositely-spaced panels and arranged in a parallel orientation across the bottom panel, each of the one or more block members being in contact with the bottom member of the shipping container and offset from each other by an adjustable distance.

10. The container of claim 9, wherein the first hingable means and the second hingable means are continuous hinges.

11. The container of claim 9, wherein the one or more spacing block members is oriented along one of the inside walls of at least one of the opposed side panels, such orientation being substantially perpendicular to the bottom panel.

12. The container of claim 9, wherein the one or more spacing block members is oriented along the inside surface of the bottom panel, perpendicular to the back panel.

13. The container of claim 9, further comprising a securing means attached to the upper front panel and the top panel.

14. The container of claim 9, further comprising a handle on at least one of the opposed end panels.

15. The container of claim 9, further comprising a plurality of wheels attached to the outside surface of the base of the container.

16. The container of claim 9, wherein the container is made from plywood, OSB, flake board, wood-based composite materials, or combinations thereof.

17. The container of claim 9, wherein the container is made from high density plastic.

18. The container of claim 9, wherein the one or more spacing block members is permanently attached to at least one panel of the container.

19. The container of claim 1, wherein at least one of the plurality of spacing block members comprises two or more adjustable guide fingers, arranged on a surface of a spacing block in a manner such that the guide fingers are adjustable along the length of the spacing block member.

* * * * *